United States Patent
Nastasi, Jr.

(10) Patent No.: US 6,750,418 B1
(45) Date of Patent: Jun. 15, 2004

(54) METHOD AND SYSTEM FOR WELD PROCESS MONITORING

(75) Inventor: John D. Nastasi, Jr., Warren, OH (US)

(73) Assignee: Electronic Data Systems Corporation, Plano, TX (US)

(*) Notice: Subject to any disclaimer, the term of this patent is extended or adjusted under 35 U.S.C. 154(b) by 0 days.

(21) Appl. No.: 10/316,971

(22) Filed: Dec. 11, 2002

(51) Int. Cl.[7] ............................................... B23K 11/25
(52) U.S. Cl. ..................................................... 219/109
(58) Field of Search ................................. 219/109, 110, 219/86.41, 86.25

(56) References Cited

U.S. PATENT DOCUMENTS

| | | | |
|---|---|---|---|
| 3,871,208 A | 3/1975 | Berg | 73/12.13 |
| 5,563,392 A | 10/1996 | Brown et al. | 235/91 R |
| 5,968,376 A | 10/1999 | Shirk | |
| 6,084,195 A | 7/2000 | Swaggerty et al. | 219/109 |
| 6,184,487 B1 | 2/2001 | Visscher | 219/91.1 |
| 6,356,808 B1 | 3/2002 | Stenberg | 318/568.1 |
| 2003/0015501 A1 | 1/2003 | Nastasi, Jr. | 219/109 |

FOREIGN PATENT DOCUMENTS

| | | |
|---|---|---|
| DE | 92 05 165.0 | 6/1992 |
| DE | 19754857 A1 | 12/1997 |

OTHER PUBLICATIONS

International Search Report in International Application No. PCT/US 02/23033, dated Oct. 23, 2002, 8 pages.
V3300 Electrode Condition Sensor Installation and Maintenance Manual, part. No. 97164B, REV.0., p I, 3–7, 9, 11–14, 1995.

*Primary Examiner*—Clifford C. Shaw
(74) *Attorney, Agent, or Firm*—Baker Botts LLP

(57) ABSTRACT

A weld tip testing element is presented. The weld tip testing element includes a first alignment member and a first lever element coupled to the alignment member. The first lever element is further coupled to a first pivot and the first alignment member is operable to determine a first alignment associated with a weld tip. If the weld tip is out of alignment the weld tip contacts the first alignment member.

26 Claims, 2 Drawing Sheets

METHOD AND SYSTEM FOR WELD PROCESS MONITORING

TECHNICAL FIELD

This invention relates in general to welding, and, more specifically to a method and system for weld process monitoring.

BACKGROUND

As computers have grown increasingly important in today's society, various industries have increasingly adopted computer controlled systems for more efficient and effective control and monitoring of equipment. Industries using automatic welding have increasingly used computer controlled equipment.

Industries involved with automatic welding have turned to computer controlled machinery to increase the efficiency of assembly lines. One common operation on an assembly line is the welding together of components. The welding operation is often performed automatically by a computer-controlled welding device. Often, a determination of proper operation of the welding device is performed manually by inspecting welds after they are performed. For example, a pry test may be used to determine a bad weld that has not properly joined two elements. However, manual inspection can be undesirable as many bad welds can be created before a problem is detected.

SUMMARY

The present invention provides a system for weld process monitoring. In one embodiment of the present invention, a weld tip testing element is described. A weld tip testing element is presented. The weld tip testing element includes a first alignment member and a first lever element coupled to the alignment member. The first lever element is further coupled to a first pivot and the first alignment member is operable to determine a first alignment associated with a weld tip. If the weld tip is out of alignment the weld tip contacts the first alignment member.

The present invention provides numerous technical advantages. Various embodiments of the present invention may provide all, some or none of these technical advantages. One such technical advantage is the capability to detect possible welding problems before many bad welds are made. By checking various elements of the performance of the welding equipment, problems and developing problems may be more quickly detected. Early detection of problems decreases the number of bad welds and increases the productivity of, for example, an assembly line. Another technical advantage is the ability to monitor weld systems with small throat distances.

BRIEF DESCRIPTION OF THE DRAWINGS

The present invention is best understood from the detailed description which follows, taken in conjunction with the accompanying drawings, in which.

DETAILED DESCRIPTION

Figure 1:
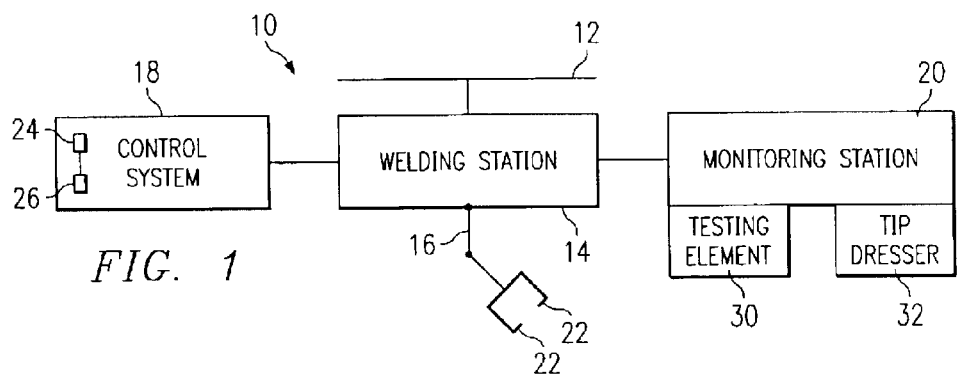
FIG. 1 is a block diagram illustrating a weld process monitoring system according to one embodiment of the present invention.

FIG. 1 is a block diagram illustrating a weld process monitoring system 10. System 10 comprises an assembly line 12, a welding station 14, a weld arm 16, a control system 18 and a monitoring station 20.

Assembly line 12 comprises a suitable assembly line for placing physical items in a location accessible by welding station 14. More specifically, assembly line 12 may move physical products along a predetermined path such that welding station 14 is given suitable time to perform one or more welds on the products.

Welding station 14 comprises a station for performing automated, manual and/or partially manually controlled welding on products on assembly line 12. More specifically, welding station 14 may provide mechanical and/or logical control of welding arm 16 for welding products on assembly line 12.

Welding arm 16 comprises an articulated or non-articulated arm operable to move to weld products on assembly line 12. Welding arm 16 also comprises one or more weld tips 22.

Weld tips 22 comprise tips operable to create a weld. In one embodiment, weld tips 22 comprise copper tips used to perform resistive welding and may be water cooled or air cooled. The invention is not limited to any specific number of weld tips 22, any particular material for fabrication weld tips 22, or any kind of cooling mechanism.

In one embodiment, weld tips 22 face each other and are brought together on opposite sides of the location of the weld. When weld tips 22 are a suitable distance from each other and the weld location, the weld is performed in a suitable way. Welding arm 16 may pivot, rotate or otherwise move in a suitable manner to appropriately position weld tips 22. The distance from weld tips 22 to welding arm 16 is known as a throat distance. More specifically, the throat distance comprises the distance from the weld tips to the point where the arm holding the weld tips is coupled to another object, such as equipment for moving the weld tips.

Control system 18 comprises a processor 24 and/or storage 26. Processor 24 comprises a suitable general purpose or specialized data processing device, such as an application specific integrated circuit (ASIC), a field programmable gate array (FPGA), a general purpose central processing unit (CPU) or other suitable hardware operable to execute computer software stored in storage 26.

Storage 26 comprises suitable transient and/or persistent computer-readable storage, such as a computer-readable medium, either alone or in suitable combination. For example, storage 26 may comprise one or more of magnetic storage, optical storage, electronic storage, such as random access memory (RAM) and dynamic random access memory (DRAM) and other suitable physical, optical or electronic storage in suitable combination. Storage 26 is operable to store computer instructions executable by processor 24. Alternatively, the functions performed by control system 18 may be performed by a combination of hardware and software or may exist entirely in hardware.

Control system 18 is operable to assist welding station 14 in the operation and control of weld arm 16 and weld tips 22. Control system 18 is further operable to receive information from monitoring station 20 and welding station 14 for storage and analysis. For example, control system 18 may receive errors or other data generated at welding station 14 or monitoring station 20 for recording in a log on storage 26. Multiple control systems 18 may be used for different components without departing from the scope of the invention. In addition, data associated with monitoring station 20 may be sent to one or more remote computers or other systems.

Monitoring station 20 comprises a testing element 30 and a tip dresser 32. Monitoring station 20 is operable to perform various testing and repair actions on weld tips 22.

Testing element 30 is operable to perform one or more tests on weld tips 22. For example, testing element 30 may determine weld tip cooling status, weld tip alignment, available squeeze force of weld tips 22, a pneumatic component status associated with arm 16, and force settings associated with welding station 14. Some of these tests may be omitted or other tests performed without departing from the scope of the invention. Testing element 30 is described in greater detail in association with FIGS. 2 and 3.

Tip dresser 32 is operable to repair weld tips 22. More specifically, as weld tips 22 are used to weld products on assembly line 12, weld tips 22 may become dull. Tip dresser 32 operates to sharpen weld tips 22. Tip dresser 32 is discussed in greater detail in association with FIG. 4.

In operation, products move along assembly line 12 to welding station 14. Welding station 14 then instructs weld arm 16 to create one or more welds on the product on assembly line 12. For example, arm 16 may be articulated and move weld tips 22 to the location where welds are needed. Weld tips 22 then generate welds as appropriate. In one embodiment, weld tips 22 squeeze around the desired location of the weld and then use resistive welding to generate a weld. More specifically, arm 16 may move weld tips 22 closer together so as to hold the portions of the product to be welded in a stationary and touching position while the weld is completed. After a predetermined number of jobs, welding station 14 moves weld tips 22 to monitoring station 20 or moves monitoring station 20 to weld tips 22. At monitoring station 20, various tests are performed on weld tips 22 by testing element 30 and tip dresser 32. Welding station 14 then returns weld arm 16 and weld tips 22 to welding products on assembly line 12.

Monitoring station 20 may determine one or more items of information from testing element 30. For example, monitoring station 20 may determine weld tip cooling status, weld tip alignment status, weld tip squeeze force status, pneumatic component status, welding force setting status, tip dressing force status, weld tip attitude with respect to tip dresser 32, tip dresser force capability status, air-binary-regulator status with respect to regulation of weld tip force, tip dresser dwell time, tip dresser blade status, whether the weld arms are bent and whether a monitoring operation has been missed.

Figure 2:
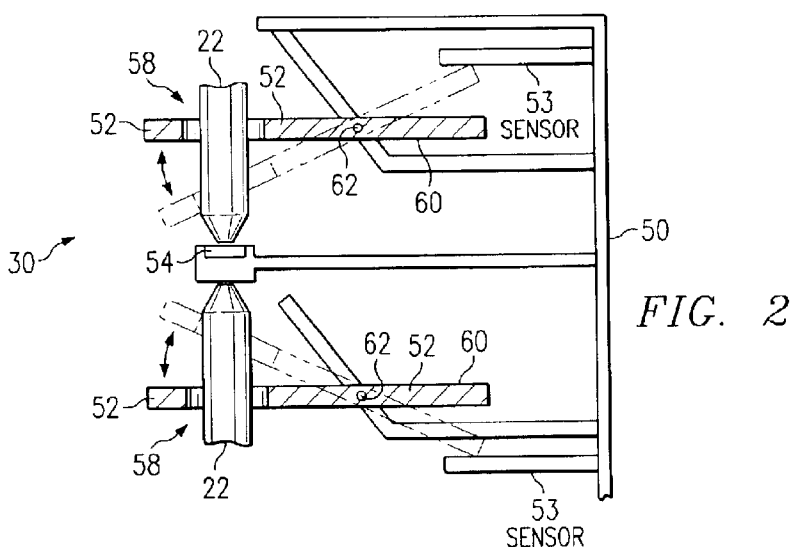
FIG. 2 is a side view illustrating details of a testing element associated with the monitoring system of FIG. 1 according to one embodiment of the present invention.
Figure 3:
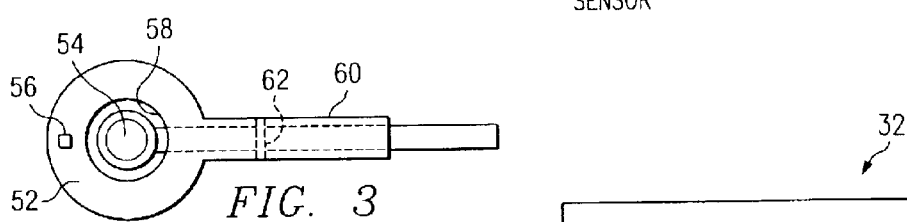
FIG. 3 is a top view of the testing element according to one embodiment of the present invention.

FIG. 2 is a side view illustrating details of an example of a testing element 30 constructed in accordance with the invention. FIG. 3 is a top view of testing element 30. FIGS. 2 and 3 are discussed together for increased clarity. Testing element 30 comprises a mounting 50, one or more alignment elements 52, one or more sensors 53, a pressure sensor 54, a temperature sensor 56, an aperture 58, a lever portion 60 and a pivot 62.

Mounting 50 provides an essentially stable attachment to monitoring station 20 such that testing element 30 is relatively securely mounted to monitoring station 20. For example, mounting element 50 may comprise a steel arm. Mounting element 50 could be any suitable shape and could be made of many different materials. A portion of mounting 50 may comprise a housing which encloses alignment elements 52, sensors 53, pressure sensor 54, temperature sensor 56, aperture 58, lever portion 60 and pivot 62 such that these elements are protected from debris and weld slag. By protecting alignment elements 52, sensors 53, pressure sensor 54, temperature sensor 56, aperture 58, lever portion 60 and pivot 62 from debris and weld slag, increased reliability may be achieved. For example, weld slag from weld tips 32 may prevent alignment elements 52 from operating and the housing may allow testing element 30 to provide more reliable operation. The housing may be made of any suitable material, such as metal or plastic, and shaped such that weld tips 32 may be inserted and removed from aperture 58.

Alignment elements 52 comprise elements operable to detect a misalignment of weld tips 22. In one embodiment, alignment elements 52 comprise members shaped like portions of a washer or an entire washer operable to move in response to contact with weld tips 22. More specifically, alignment element 52 pivots around pivot 62 and moves lever portion 60 into contact with sensor 53. Further, alignment element 52 may use one or more springs to return and/or retain alignment element 52 in a particular position. For example, the spring may be used to return alignment element 52 to an initial position after contact with a misaligned weld tip 32. For another example, if alignment element 52 is mounted The shape of alignment elements 52 is relatively unimportant, as is the number of alignment elements 52 so long as alignment elements 52 are operable to detect misalignment of weld tips 22. In one embodiment, a single alignment element 52 is located on each of opposing sides of testing element 30. However, multiple alignment elements 52 could be included such that the direction of misalignment could be sensed. For example, four sensors could be placed to generally form a washer-like shape to locate misalignment in one of four quadrants. Alternatively, alignment element 52 may comprise a laser, an infrared sensor or other suitable mechanical, electrical or optical alignment detection equipment. Movement of alignment elements 52 is detectable by monitoring station 20. The particular alignment element 52 which is moved may also be available to monitoring station 20.

In one embodiment, alignment element 52 may comprise a generally circular element coupled to an end of lever portion 60. Lever portion 60 may comprise a rod, bar or other object operable to support alignment element 52 and pivot about pivot 62. Lever portion 60 may be formed as part of alignment element 52 or may be separately coupled to alignment element 52. Lever portion 60 may further be of a size different from alignment element 52. For example, as shown in FIG. 3, lever portion 60 may be smaller than alignment element 52.

In one embodiment, weld arm 16 and weld tips 22 may be used for small welds and be limited in movement. More specifically, the maximum distance between weld tips 22 may be approximately 1.25 inches, while weld tips 22 and arm 16 for larger welds may be capable of opening approximately 6 inches. In addition, weld tips 22 may have short throat distances when precision welding systems are used. Alignment elements 52 may be selected based on the distance between weld tips and the throat distance. For example, particular alignment elements 52 may be physically too large to implement for a particular set of weld tips 22.

Aperture 58 is disposed within alignment element 52 and allows insertion of weld tips 22 through alignment element 52. If weld tips 22 are not aligned with aperture 58, then alignment element 52 will be activated. The size of aperture 58 may be varied in order to set particular tolerances for the alignment of weld tips 22. For example, a three-quarter inch tip may be used with a seven-eighths inch aperture 58 so as to allow minimal tolerance for misalignment of weld tips 22.

Sensor 53 comprises a detection element operable to detect movement of lever portion 60. In one embodiment, sensor 53 may detect contact between lever portion 60 and sensor 53 in response to force applied to alignment element 52, such as when weld tip 22 comes into contact with alignment element 52. In one embodiment, contact between sensor 53 and lever portion 60 causes generation of a piezo-electric charge which is receivable by monitoring station 20 for analysis by control system 18. In another embodiment, movement of alignment elements 52 by sensors 53 may be detected by a laser or other optical system, for example, where the movement of alignment element 52 and/or lever portion 60 breaks one or more laser beams. In general, one or more sensors 53 may be coupled to mounting 50 for detecting movement of alignment element 52. For example, sensor 53 may comprise a laser, a piezo-electric current generator responsive to spring 53, a mechanical sensor, an optical sensor, an electronic sensor, a magnetic sensor or other suitable sensing device, either alone or in suitable commination.

Force sensor 54 comprises a sensor element operable to measure the force exerted by weld tips 22. For example, force sensor 54 may comprise a strain gauge, a load cell, or other mechanical force sensors.

Temperature sensor 56 comprises a sensor operable to detect the temperature of welding tip 22. Temperature sensors 56 may be operable to individually determine the temperature of the one of weld tips 22 to which the temperature sensor 56 is adjacent. For example, temperature sensors 56 may detect the heat radiated by weld tips 22 as weld tips 22 are inserted into testing element 30. Infrared sensor 56 may comprise an infrared heat sensor, a thermocouple or other suitable temperature measurement equipment. As noted, one temperature sensor 56 may separately determine the temperature of an upper weld tip while a second temperature sensor 56 determines the temperature of a lower weld tip.

Lever portion 60 comprises a portion of alignment element 52 operable to indicate contact between alignment element 52 and weld tips 22. Alternatively, lever port-ion 60 may be coupled to a distinct alignment element 52. More specifically, lever portion 60 may move in response to contact between alignment element 52 and weld tips 22 to activate sensor 53 and indicate misalignment of weld tips 22. Lever portion 60 may be of suitable shape, size and weight as appropriate with respect to weld tips 22. For example, lever portion 60 may be generally as wide as the diameter of alignment element 52, or may be smaller or larger. For another example, lever portion 60 may outweigh alignment element 52 so that lever portion 60 moves only when alignment element 52 is moved by misaligned weld tips 22.

Pivot 62 comprises a suitable pivot point operable to support alignment element 52 and lever portion 60, and allow movement of alignment element 52 and lever portion 60. For example, pivot 62 may comprise a hinge, a pin, a rod or other suitable pivot element.

In operation, weld tips 22 are inserted into testing element 30 through aperture 58. If weld tips 22 are misaligned from their expected position, then weld tips 22 will impact one or more of alignment elements 52. If alignment elements 52 move in response to weld tips 22, then monitoring station 20 will sense a misalignment of weld tips 22. Alternatively, when alignment element 52 comprises optical devices, such as lasers, misalignment may be detected by intersection of weld tips 22 with a laser beam. More specifically, lever portion 60 moves around pivot 62 in response to movement of alignment elements 52 and activates sensor 53 to indicate misalignment of weld tips 22.

In one embodiment, by detecting which alignment elements 52 are moved, monitoring station 20 may be given more detailed information with respect to the nature and extent of the misalignment of weld tips 22 where multiple sensors are used on each side of testing element 30.

Temperature sensors 56 determine the current temperature of weld tips 22 and the associated data is captured by monitoring station 20. Force sensor 54 determines the amount of pressure provided by weld tips 22 and the associated data is also captured by monitoring station 20. More specifically, weld tips 22 may be inserted into aperture 58 with the same amount of speed and pressure used when weld tips 22 are welding products. After relevant measurements have been made, weld tips 22 withdrawn from testing element 30 can be moved to tip dresser 32 or can be returned to performing welding.

Figure 3A:
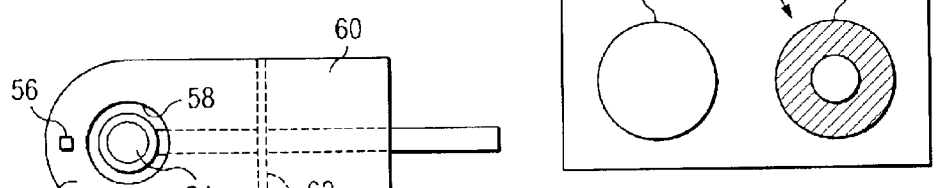
FIG. 3A is a top view illustrating an alignment element according to one embodiment of the present invention.
Figure 4:
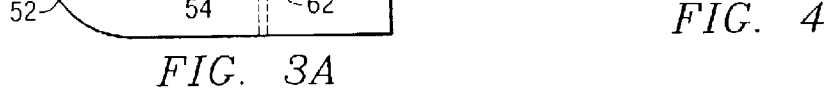
FIG. 4 is a diagram illustrating further details of a tip dresser associated with the monitoring station of FIG. 1 according to one embodiment of the present invention.

FIG. 3A is a top view of one embodiment of alignment member 52 and lever portion 60. In this embodiment alignment element 52 may comprise a generally flat bar with a hole, or other suitable aperture, at the end. The bar may be made of metal, plastic or other suitable material. Lever portion 60 of the bar is generally rectangular and alignment member 52 is generally rounded FIG. 4 is a diagram illustrating further details of tip dresser 32. Tip dresser 32 comprises a tip dresser element 100, a load sensor 101 and a vibration sensor 102. Tip dresser element 100 comprises an element operable to receive weld tip 22 and sharpen weld tip 22. More specifically, tip 22 is inserted in tip dresser element 100 to be sharpened. Tip dresser element 100 may use spinning blades driven by a motor to sharpen weld tips 22. Typically, the act of sharpening a weld tip 22 is referred to as "tip dressing", dresser element 100 may be coupled to monitoring station 20.

Motor load current sensor 101 is coupled to tip dresser element 100 and is operable to detect the electrical current draw of the motor driving the blades of tip dresser element 100. Motor load current sensor 101 communicates the electrical current draw of the tip dresser motor to monitoring station 20.

Peak vibration accelerometer 102 detects the peak vibration of tip dresser element 100. By detecting the vibration of tip dresser element 100, peak vibration accelerometer 102 is operable to detect an unbalanced or malfunctioning tip dresser motor.

In operation, weld tips 22 are inserted into tip dresser element 100 for sharpening. Tip dresser element 100 then rotates one or more blades at an appropriate speed in order to sharpen weld tips 22. More specifically, tip dresser element 100 attempts to form a pointed tip on weld tips 22. Current sensor 101 measures the amount of electrical current drawn by a motor driving the blades and communicates the amount of electrical current drawn by the motor to control system 18 for analysis. The amount of electrical current drawn by the motor may indicate a failing motor, such as by drawing more electrical current than usual, dulled blades or other problems. Accelerometer 102 detects the amount of vibration resulting from operation of tip dresser element 100. The detected vibration levels are communicated to control system 18 for analysis. For example, increasing vibration may indicate a broken blade which is unbalancing tip dresser element 100.

Figure 5:
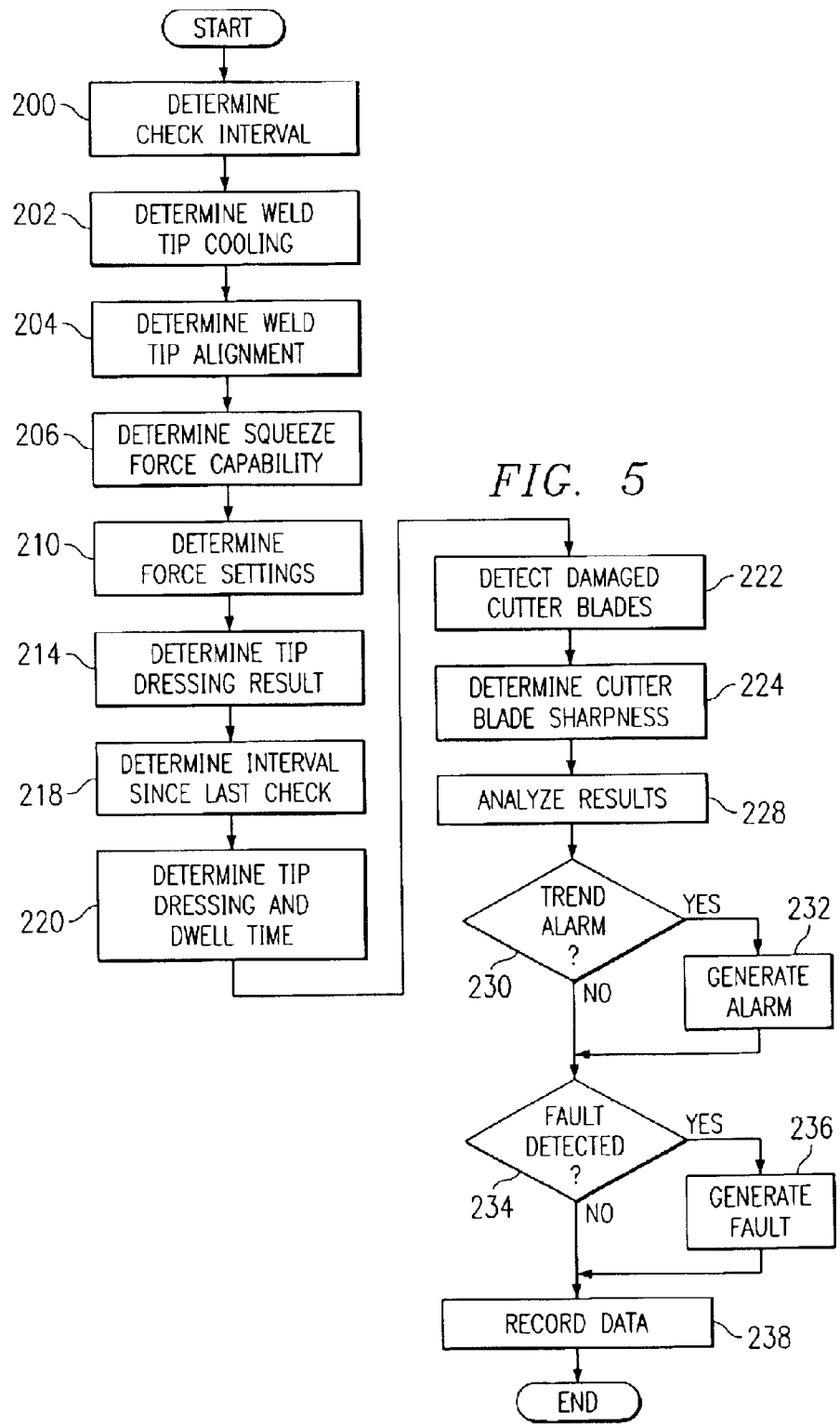
FIG. 5 is a flow chart illustrating an exemplary method of operation of the monitoring system of FIG. 1 according to one embodiment of the present invention.

FIG. 5 is a flow chart illustrating an exemplary method of operation of system 10, unless an order for the various steps is obviously required, the steps could occur in any order. The method begins at step 200, where control system 18 determines whether the check interval for weld arm 16 and weld tips 22 has been reached. Alternatively, control system 18 may monitor tip dresser 32. More specifically, control system 18 may monitor tip dresser 32 for the start of a motor driving tip dresser 32. Control system 18 may use the start of the motor for tip dresser 32 to indicate that weld tips 22 are to be checked by testing element 30. For example, timing or other logic associated with tip dresser 32 may determine that weld tips 22 are to dressed and control system 18 may use this logic to activate testing element 30 and test weld tips 22. By monitoring tip dresser 32, testing element 30 may operate more independently of other elements of system 10. For example, testing element 30 may be added to an existing system such that testing element 30 monitors tip dresser 32 which may decrease the cost of adding testing element 30 to an existing system.

In one embodiment, the check interval is reached when welding station 14 has performed a certain number of jobs, where a job comprises a certain number of welds. For example, after five jobs involving ten welds each, control system 18 may determine that the check interval has been reached and have welding station 14 move control arm 16 and weld tips 22 to monitoring station 20 for testing. Alternatively, monitoring station 20 may move to weld tips 22 or both weld tips 22 and monitoring station 20 may move.

Next, at step 202, testing element 30 determines the temperature of weld tips 22. More specifically, using temperature sensors 56, the temperature of weld tips 22 may be determined. Once the temperature of weld tips 22 is determined, the amount of cooling being provided at the weld tip may be determined by comparing the actual temperature of weld tips 22 to an expected temperature or range of temperatures for weld tips 22. Thus, malfunctions in the weld tip cooling system or defects in the weld tips 22 may be detected. More specifically, weld tips 22 may be cooled using a water cooling system where water is circulated through arm 16 to weld tips 22 to draw away heat generated during the welding process. Improper cooling of weld tips 22 may contribute to decrease the life span of weld tips 22 and increase the chance of improper welding.

At step 204, the alignment of weld tips 22 is determined by monitoring station 20. More specifically, as weld tips 22 are inserted in testing element 30, alignment elements 52 may be moved. If the alignment elements 52 are moved by weld tips 22, then weld tips 22 and/or arm 16 are not correctly aligned. Control system 18 and monitoring station 20 can then use this information to realign arm 16 and/or weld tips 22 and/or to inform repair personnel of the need to realign arm 16 and weld tips 22.

Proceeding to step 206, the squeeze force applied to weld tips 22 is determined. More specifically, force sensor 54 measures and records the amount of pressure exerted by weld tips 22. As weld tips 22 are used to weld products on assembly line 12, their capability to squeeze with sufficient force may decrease due to wear or other problems. Monitoring station 20 may be used to ensure that the proper squeeze force is applied to properly weld products. The measured squeeze force at sensor 54 may be communicated to monitoring station 20 for analysis at control system 18 and/or sent to remote computer systems.

Then, at step 210, weld tips 22 are moved from testing element 30 to tip dresser 32 (or tip dresser 32 is moved or weld tips 22 and tip dresser 32 are both moved). At tip dresser 32 the force setting of tip dressing element 100 is determined. More specifically, the amount of force used to spin the cutting blades of tip dresser element 100 is determined using the current measurement described above.

At step 214, accelerometer 102 is used to detect excess vibration, which could indicate a bent weld gun or bad alignment.

Next, at step 218, the interval since the last check performed by monitoring station 20 and arm 16 and weld tips 22 is determined. More specifically, control system 18 analyzes information from monitoring station 20, such as the time of the present check of arm 16 and weld tips 22, and determines if an unusual and/or unexpected amount of time has passed since the last check operation.

Proceeding to step 220, the amount of time taken by the tip dressing operation by tip dresser element 100 is determined. Then, at step 222, damaged cutter blades in tip dresser element 100 are detected based upon this time interval and/or a vibration analysis using accelerometer 102.

Then, at step 224, cutter blade sharpness is estimated. More specifically, cutter blade sharpness is estimated by analyzing the amount of time needed to sharpen the weld tip 22. Dull cutter blades may not sharpen tip 22 appropriately and/or may take an unexpected amount of time.

Then, at step 228, control system 18 analyzes the results of steps 200 through 226. More specifically, a predetermined acceptable range may be associated with each measured item, such as temperature, alignment and squeeze force. The measured value is then compared to the expected value. In addition, control system 18 may have fault ranges for the various measured elements, such as temperature, alignment and squeeze force, may be provided to system 18. Control system 18 may then compare the measured values to the fault range of values. The fault range indicates operating values of the measured elements that indicate imminent failure or serious problems.

Proceeding to decisional step 230, control system 18 determines whether an alarm should be generated. More specifically, an alarm may be a trend detected based on the analysis of the information gathered indicating that while things are currently operating within parameters that a problem may soon occur. For example, tip dresser 32 may currently be operating within acceptable operating parameters, but an analysis of tip dresser 32 may indicate that major replacement may soon be needed. Alarms may be generated using historical data and/or the currently measured data.

For another example, the measured temperature of tip dresser 22 may exceed the acceptable range of temperatures for a tip dresser 22. This information can be used by a plant manager or other administrator to schedule down time for monitoring station 20 and schedule other replacement and repair operations associated with the monitoring station 20. For another example, arm 16 and weld tips 22 may presently be operating within acceptable parameters, but analysis of the data returned by monitoring station 20 may indicate that significant work my soon be needed. If a trend is detected, then the YES branch of decisional step 230 leads to step 232.

At step 232, an alarm is generated and communicated to an appropriate person indicating the trend that has been detected. For example, probable failure in the near future may be communicated to a plant manager or operational supervisor via e-mail indicating the imminent failure and the analysis which indicated the imminent failure. The plant manager may then use the alarm to schedule maintenance so as to decrease the down time and impact of the repair. In one embodiment, the alarm includes the data which triggered the alarm. Returning to step 230, if no alarms are to be generated, then the NO branch leads to decisional step 234.

At decisional step 234, control system 18 determines whether a fault exists. Typically, a fault indicates more immediate problems than alarms. For example, imminent failure of weld tips 22 may be detected by control system 18 analyzing information from monitoring station 20. If a fault is detected by control system 18, then the YES branch of decisional step 234 leads to step 236. At step 236, a fault is generated and communicated to an appropriate person. In some embodiments, a fault may cause automatic shutdown of the welding equipment. For example, imminent failure of the cooling system for weld tips 22 may be communicated via a message sent to a plant manager. In one embodiment, the fault includes the data which triggered the fault. Returning to step 234, if no fault is detected then the NO branch of decisional 234 leads to step 238.

At step 238, control system 18 records data received from monitoring station 20 on storage 26. In one embodiment, data is recorded by control system 18 in the manner consistent with ISO 9000 procedures. The method then ends.

Other changes, substitutions, and alterations are also possible without departing from the spirit and scope of the present invention, as defined by the following claims.

What is claimed is:

1. A weld tip testing apparatus for use with a welder comprising a first weld tip and a second weld tip, the testing apparatus comprising:
    a first alignment member coupled to a first pivot;
    a first alignment sensor;
    a second alignment member coupled to a second pivot;
    a second alignment sensor different from the first alignment sensor;
    wherein the first weld tip's contacting of the first alignment member causes it to move;
    wherein the first alignment sensor detects movement by the first alignment member;
    wherein the second weld tip's contacting of the second alignment member causes it to move; and
    wherein the second alignment sensor detects movement by the second alignment member.

2. The weld tip testing apparatus according to claim 1, wherein the first alignment member further comprises an aperture disposed therethrough, wherein the aperture is operable to removeably receive the weld tip.

3. The weld tip testing apparatus according to claim 2, wherein a size of the aperture is based on an alignment tolerance associated with the first weld tip.

4. The weld tip testing apparatus according to claim 1 wherein the first alignment sensor detects movement by the first alignment member by detecting contact between the first alignment sensor and the first alignment member.

5. The weld tip testing apparatus according to claim 4, wherein the first alignment sensor comprises a piezo-electric sensor.

6. The weld tip testing apparatus according to claim 1, wherein the first alignment sensor comprises a laser.

7. The weld tip testing apparatus according to claim 1 and further comprising:
    computer software encoded on storage and operable to:
        receive a signal from the first alignment sensor;
        analyze the signal; and
        generate an alarm based on the analysis.

8. The weld tip testing apparatus according to claim 1, wherein the first alignment sensor comprises a sensor selected from the group consisting of a magnetic sensor, a mechanical sensor, and an optical sensor.

9. The weld tip testing apparatus according to claim 1, and further comprising:
    a pressure sensor operable to determine a squeeze force associated with at least the first weld tip; and
    a heat sensor operable to determine a temperature associated with at least the first weld tip.

10. The weld tip testing apparatus according to claim 1, wherein the first alignment member comprises a generally flat bar with at least one generally rounded end having an aperture disposed therethrough.

11. The weld tip testing apparatus according to claim 1, wherein the first alignment member operates to depress in response to contact with the first weld tip and wherein the first alignment member causes generation of a piezo-electric charge in response to contact between the first alignment member and the first alignment sensor.

12. The weld tip testing apparatus according to claim 1, wherein the alignment member comprises multiple pieces joined together.

13. A weld process monitor for use with a welder comprising a first weld tip and a second weld tip, the weld process monitor comprising:
    a pressure sensor operable to determine a squeeze force associated with at least the first weld tip;
    a heat sensor operable to determine a temperature associated with at least the first weld tip;
    a first alignment member coupled to a first pivot;
    a first alignment sensor;
    a second alignment member coupled to a second pivot;
    a second alignment sensor different from the first alignment sensor;
    wherein the first weld tip's contacting of the first alignment member causes it to move;
    wherein the first alignment sensor detects movement by the first alignment member;
    wherein the second weld tip's contacting of the second alignment member causes it to move; and
    wherein the second alignment sensor detects movement by the second alignment member;
    computer software encoded on storage and operable to:
        analyze at least one of the squeeze force, the temperature, the detection of movement by the first sensor, and the detection of movement by the second sensor with respect to at least one expected value; and
        generate an alarm based on the analysis.

14. The weld process monitor according to claim 13, wherein the first alignment member comprises a generally flat bar with a generally rounded end having an aperture disposed therethrough.

15. The weld process monitor according to claim 14, wherein a size of the aperture is based on an alignment tolerance associated with the first weld tip.

16. The weld process monitor according to claim 13, wherein the software is further operable to:
    compare one of the squeeze force or the temperature to one of a respective range of expected squeeze forces or a range of expected temperatures;
    generate the alarm when one of the squeeze force or the temperature exceeds one of the range of respective expected squeeze forces or expected temperatures; and
    communicate the alarm to an appropriate recipient.

17. The weld process monitor according to claim 13, wherein the software is further operable to:
    compare one of the squeeze force or the temperature to one of a range of fault squeeze forces or a range of fault temperatures;
    generate a fault when one of the squeeze force or the temperature is respectively within one of the range of fault squeeze forces or the range of fault temperatures; and
    communicate the fault to an appropriate recipient.

18. The weld process monitor according to claim 13, wherein the first alignment sensor detects movement by the first alignment member by detecting contact between the first alignment sensor and the first alignment member.

19. The weld process monitor according to claim 18, wherein the first alignment member operates to depress in response to contact with the first weld tip and wherein the first alignment member causes generation of a piezo-electric charge in response to contact between the first alignment member and the first alignment sensor.

20. The weld process monitor according to claim 13, wherein the alignment member comprises multiple pieces joined together.

21. A method of testing a welder comprising a first weld tip and a second weld tip, the method comprising:
    detecting motion of a first alignment member coupled to a first pivot using a first alignment sensor when the first weld tip contacts the first alignment member and causes it to move; and
    detecting motion of a second alignment member coupled to a second pivot using a second alignment sensor separate from the first alignment sensor when the second weld tip contacts the first alignment member and causes it to move.

22. The method of claim 21, further comprising:
    determining a squeeze force associated with at least the first weld tip using a pressure sensor.

23. The method of claim 22, further comprising:
    determining a temperature associated with at least the first weld tip using a heat sensor.

24. The method of claim 23, further comprising:
    using computer software to compare one of the squeeze force or the temperature to one of a range of fault squeeze forces or a range of fault temperatures;
    generate a fault when one of the squeeze force or the temperature is respectively within one of the range of fault squeeze forces or the range of fault temperatures; and
    communicate the fault to an appropriate recipient.

25. The method of claim 23, further comprising:
    using computer software to compare one of the squeeze force or the temperature to one of a range of alarm squeeze forces or a range of alarm temperatures;
    generate an alarm when one of the squeeze force or the temperature is respectively within one of the range of alarm squeeze forces or the range of alarm temperatures; and
    communicate the alarm to an appropriate recipient.

26. The method of claim 21, wherein the first alignment sensor detects movement by the first alignment member by detecting contact between the first alignment sensor and the first alignment member.

* * * * *